UNITED STATES PATENT OFFICE.

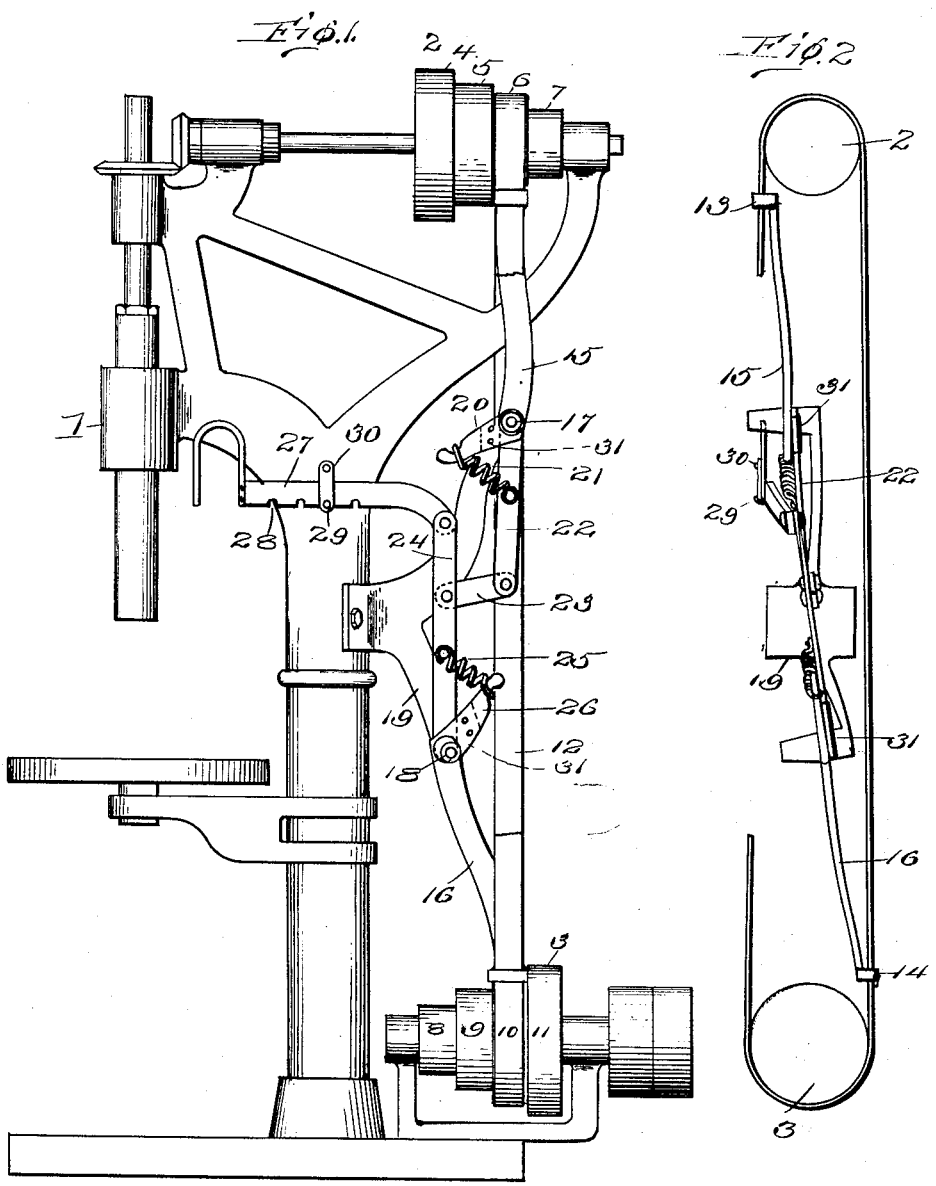

ALBERT A. WOOD, OF ATLANTA, GEORGIA.

BELT-SHIFTING MECHANISM.

938,931.                    Specification of Letters Patent.    Patented Nov. 2, 1909.

Application filed November 27, 1908.   Serial No. 464,680.

*To all whom it may concern:*

Be it known that I, ALBERT A. WOOD, a citizen of the United States, residing at Atlanta, in the county of Fulton and State of Georgia, have invented certain new and useful Improvements in Belt-Shifting Mechanism; and I do hereby declare the following to be a full, clear, and exact description of the invention, such as will enable others skilled in the art to which it appertains to make and use the same.

This invention relates to improvements in belt shifting means, and particularly to means that will shift both ends of the belt at approximately the same time without the operator moving from his customary place, and has for an object the provision of means that will positively and rigidly force one end of the belt from one pulley to another and at the same time yieldingly press against the opposite end of the belt for moving the opposite end from one pulley to another, the yielding pressure permitting the movement of the belt a short time after the movement of the belt by the rigidly operated means.

Another object of the invention is the provision of means for shifting the belt on a cone pulley while the belt is running by means of levers engaging the belt near each step of the cone pulley on the side of the belt where it runs onto the pulley, the means engaging the belt forcing the belt from a large step to a smaller step at one end of the belt, and then from a small step to a larger step at the opposite end.

A further object of the invention is the provision of means for shifting belts while moving which acts in one direction against the belt rigidly and elastically or yieldingly in the opposite direction so that when forcing a belt off of a large step to a smaller step, the device will respond rigidly while the succeeding movement at the opposite end of the belt will be of a yielding character so as to yieldingly or elastically force the belt from a small pulley to a larger pulley, the yielding or elastic action at one end of the device permitting the slacking of the belt by moving the same off a large pulley to a smaller pulley previous to moving the opposite end of the belt from a small pulley to a larger pulley.

With these and other objects in view the invention comprises certain novel constructions, combinations and arrangement of parts as will be hereinafter more fully described and claimed.

In the accompanying drawings: Figure 1 is a side elevation of a drill press with the invention applied thereto. Fig. 2 is an edge view of the invention shown in Fig. 1 shown in connection with a belt and pulleys.

In the shifting of belts on cone pulleys it is necessary to first shift the end of the belt from a larger step to a smaller step, and then to move the end of the belt on the opposite set of steps from the smaller step to a larger step. As will be evident the reason of this is simply that it is necessary to slack the belt before the same may be moved from a smaller step to a larger one, and in order to operate the belt in this manner means must be provided that will first force the belt from the larger pulley at one end of the belt to a smaller pulley before the opposite end of the belt is moved. In the present invention a plurality of levers are arranged each of which is adapted to bear against the respective ends of the belt rigidly in one direction and elastically or yieldingly in the opposite direction, the rigid response or action of the lever being adapted to throw off the belt from a larger to a smaller step, while the elastic action is adapted to throw from a smaller to a larger step.

In order that the invention may be more clearly understood an embodiment of the same is shown in the accompanying drawings in which—

1 indicates a drill press to which the device is secured. It will be evident that the device may be secured to any other machine that may be desired, the drill press shown in the accompanying drawings being simply for the purpose of illustration. Drill press 1 is provided with pulleys 2 and 3 having steps 4, 5, 6, 7, 8, 9, 10 and 11 upon which belt 12 is adapted to run. The pulleys 2 and 3 and belt 12 may be of any preferred construction. Encircling the belt near each end thereof are guiding members 13 and 14 respectively that are rigidly secured to levers 15 and 16, which in turn are pivotally mounted at 17 and 18 to a base member or support 19. The support 19 is secured to drill press 1 in any desired manner so as to be firmly supported thereby. Lever 15 has extending therefrom an auxiliary lever 20 that is either formed integral with lever 15 or rigidly secured thereto and has connected therewith a spring 21 which in turn is connected with lever 22 that is pivoted at one end to pivot member 17 and has secured thereto at the opposite end a link 23. Link 23 in turn is pivotally secured to lever 24 which is pivotally mounted upon pivotal pin 18 and has connected therewith a spring 25 that acts upon an auxiliary lever 26 rigidly connected with lever 16 in a similar manner to the way auxiliary lever 20 is connected with lever 15. Pivotally connected with lever 24 is a latch or operating arm 27 that is formed with notches 28 that are adapted to engage pin 29 which passes through an inclosing and guiding member 30. In constructing the device there is arranged a notch 28 for each of the steps of the pulleys 2 and 3 so that when the belt has been shifted to any particular step the shifting means will be locked in position by having one of notches 28 engage pin 29.

Rigidly secured to auxiliary lever 20 is a lug 31 that is adapted to engage or strike against one end of lever 22 so that when there is any movement of lever 22 for forcing lever 15 in such direction as to move belt 12 from off a larger step on pulley 2 to a smaller one the same will respond rigidly. Lug 31 is secured to auxiliary lever 26 in a similar manner and is adapted to act similarly; namely, to cause lever 16 to respond rigidly when moving belt 12 from off a large step on pulley 3 to a smaller one. When it is desired to move belt 12 for instance from steps 6 and 10 to steps 7 and 11 operating lever or arm 27 is moved in a direction at right angles to the travel of belt 12 which will cause lever 22 to press against lug 31 and convey motion thereto which will be conveyed instantly to auxiliary lever 15 for positively forcing belt 12 from step 6 to step 7. This action is a rigid one as none of the parts are arranged to yield in the least during this movement. At the same time that this action takes place lever 24 is moving and conveying motion to spring 25, which in turn presses resiliently or yieldingly against auxiliary lever 26. Motion will be conveyed from lever 26 to lever 16 and from thence to belt 12. In this manner a yielding pressure is brought to bear upon belt 12 to force the same from step 10 to step 11, but as long as the belt is tight it will remain in its original position upon step 10, but immediately upon the belt becoming slack by reason of the same being forced from step 6 to step 7 on pulley 2 the yielding pressure against the belt near pulley 3 will cause the same to move over upon step 11. If it is desired to move the belt in the opposite direction to that just set forth arm 27 will be moved in an opposite direction which will cause lever 16 to respond rigidly and lever 15 to respond yieldingly so that there will be a positive and an unyielding forcing of belt 12 from a large step to a smaller step on pulley 3, and a yielding action on lever 15 for forcing belt 12 from a smaller step to a larger step on pulley 2. Lever 27 may be positioned at any desired place, but preferably in easy reach of the operator of the press or other machine to which the device is applied so that when a change of speed is desired he may move any of the notches 28 to engage pin 29, and consequently vary the speed to the desired extent without moving from his customary place, and without being compelled to leave his place during the shifting of the belt. It will also be observed, by the reason of levers 15 and 16 and the surrounding guides 13 and 14, the belt will be positively held in position on any desired set of cones, and therefore there will be no danger of the accidental slipping off of the belt during the operation of the machine.

What I claim is:

1. In a device of the character described, the combination with a belt, of a base, a bifurcated support secured to said base, pivotally mounted levers connected with said bifurcated support and loosely engaging said belt, and means for moving said levers so as to cause said belt to be shifted at one point and then at the opposite point in succession.

2. In a device of the character described, the combination with a belt, of a base, a bifurcated support secured to said base, a plurality of levers pivotally mounted on said bifurcated support, and loosely engaging the belt, a second set of levers pivotally secured to said bifurcated support, means for causing said second mentioned levers to act at the same time, lugs for conveying motion from said first mentioned levers to said second mentioned levers, and a spring connecting each of said second mentioned levers with the respective levers first mentioned whereby upon the movement of said second mentioned levers movement will be conveyed to said first mentioned levers for causing said first mentioned levers to shift said belt.

3. In a device of the character described, a base, a pair of levers connected therewith, a second pair of pivotally mounted levers, a link connecting said second pair of levers for causing said levers to move at the same time, a reciprocating bar connected with one of said second mentioned levers for moving the same, a lug connected with each of said first mentioned levers adapted to contact with said second mentioned levers, whereby motion is conveyed to said first mentioned levers, and springs connecting each of said first mentioned levers with one of said second mentioned levers, whereby one end of said first mentioned levers will be yieldingly moved in one direction, and one end of the other of said first mentioned levers will be unyieldingly moved in the same direction.

4. In a device of the character described, a base, a pair of levers pivotally connected therewith and formed with auxiliary levers projecting from one end of each of said levers, a second pair of levers, a link connecting said second pair of levers for causing both of said second pair of levers to move at the same time, a spring connected to each of said second mentioned pair of levers and to said auxiliary levers, a lug connected to each of said auxiliary levers and adapted to engage said second mentioned pair of levers, and an arm connected to said second pair of levers for moving the same, whereby movement will be conveyed to said first mentioned pair of levers, said lugs causing one end of each of said first mentioned levers to move unyieldingly in one direction, and said springs causing one end of each of said first mentioned levers to move yieldingly in the opposite direction.

In testimony whereof I affix my signature in presence of two witnesses.

ALBERT A. WOOD.

Witnesses:
 ALBERT P. WOOD,
 CLARENCE J. BRYANT.